United States Patent [19]

Lundquist, Jr. et al.

[11] 4,287,276

[45] Sep. 1, 1981

[54] ALKALINE BATTERY WITH SEPARATOR OF HIGH SURFACE AREA

[75] Inventors: Joseph T. Lundquist, Jr., Columbia; Christian B. Lundsager, Ashton, both of Md.

[73] Assignee: W. R. Grace & Co., New York, N.Y.

[21] Appl. No.: 46,990

[22] Filed: Jun. 8, 1979

[51] Int. Cl.³ .............................................. H01M 6/04

[52] U.S. Cl. .................................... 429/206; 429/251; 429/254

[58] Field of Search .............. 429/251, 252, 254, 206, 429/221, 223, 229

[56] References Cited

U.S. PATENT DOCUMENTS

| | | | |
|---|---|---|---|
| 3,045,058 | 7/1962 | Martinak | 429/251 X |
| 3,351,495 | 11/1967 | Larsen et al. | 429/252 |
| 3,749,604 | 7/1973 | Langer et al. | 429/251 X |
| 3,861,963 | 1/1975 | Arrance | 429/251 |

*Primary Examiner*—Charles F. Lefevour

*Attorney, Agent, or Firm*—Howard J. Troffkin

[57] ABSTRACT

The instant invention is directed to battery separator membranes useful in alkaline battery systems formed from a homogeneous admixture of a polyolefin, a plasticizer, and a filler selected from particulate material having a surface area of from 100 to 385 $m^2$/cc and a pore volume of at least 0.075 cc/gm.

13 Claims, No Drawings

ALKALINE BATTERY WITH SEPARATOR OF HIGH SURFACE AREA

BACKGROUND OF THE INVENTION

The instant invention is directed to an improved battery separator membrane suitable for use in alkaline battery systems, such as nickel-zinc systems, which is capable of exhibiting an unexpected high degree of dendrite inhibition, electrical conductivity, stability to alkali, and ability to form very thin membranes.

Alkaline battery systems, because of their high energy density, have great potential for replacing the more conventional lead-acid battery system in a number of terrestrial applications. However, extending the cycle life of such batteries beyond that presently attainable and reducing the cost of all the components are required criterias which must be met to make the alkaline battery an effective energy source.

One of the recognized key components in extending the life and efficiency of the battery is its separator. The separator is a membrane located between the plates of opposite polarity to prevent contact between the plates while freely permitting electrolytic conduction. Contact between plates may be due to imperfections in the plate structure or due to warping or wrinkling of the plate during use. Such macro deformations are readily inhibited by any type of sheet material which is coextensive with that of the plates. Contact may also occur due to the formation of dendrites or localized needle like growths on an electrode, such as zinc dendrites formed on a zinc electrode in an alkaline nickel-zinc battery system. These dendrites bridge the gap between electrodes of opposite polarity either by puncturing the separator membrane located in the gap, or by passing through the pores of the separator. The high degree of solubility of zinc oxide in alkaline electrolytes normally permits extensive loss of active material from the negative electrode through deposition of the zinc oxide in the separator pores and onto the positive electrode. These factors cause shorting out of the battery system and significantly reduce its effective life. The ability to produce a separator membrane which can effectively act as a dendristatic diaphragm is a required criteria for forming an effective battery system.

Further, a separator suitable for use in forming a highly effective alkaline battery system must be capable of exhibiting a high degree of electrical conductivity. Stated another way, an effective separator membrane must exhibit a low electrical resistance and good wetting properties.

U.S. Pat. No. 3,351,495 discloses battery separators for use in both acid and alkaline battery systems formed from very high molecular weight polyolefin compounded with a plasticizer and an inert filler. The reference further teaches that, in alkaline battery separators, filler having relatively low surface areas, e.e., one square meter per gram or less, are satisfactorily employed. Battery separators formed in accordance with the general procedure and materials disclosed in this patent exhibit a high degree of electrical resistance and poor wetting properties. These separators, therefore, do little to enhance the efficiency and effectiveness of the resultant battery systems.

U.S. Pat. No. 4,024,323 is directed to a variation of the 3,351,495 battery separator which aids in processability. The resultant separator has similar defects.

A battery separator which is capable of increasing the efficiency of a battery system and cause it to have a high energy density is highly desired, especially with respect to alkaline battery systems. It is generally agreed that such separators should be (a) resistant to degradation by the alkaline electrolyte and by oxidation due to nascent oxygen, (b) be very thin, (c) exhibit a high degree of inhibition to dendrite formation and growth, and (d) exhibit a high degree of electrical conductivity. The first two elements and the last two elements are each thought to be counter productive with respect to each other. For example, very thin sheets have a high surface area to volume ratio and are, therefore, more susceptible to attack by the strong alkaline electrolyte solution and to oxidation. With respect to the latter two criterias, it is known that separator membranes which are nonporous normally exhibit a high degree of inhibition to dendrite formation, but have low electrical conductivity. Microporous separators, that is those which have discrete pores usually in the form of a tortuous network, have a high degree of electrolyte permeability but they lack the ability to inhibit dendritic shorting.

SUMMARY OF THE INVENTION

The present invention is directed to an improved separator membrane which is resistant to degradation by common alkaline electrolyte solutions and oxidation, can be formed into thin sheets, exhibits a high degree of inhibition to dendrite formation and growth while also exhibiting a high degree of electrical conductivity (a low degree of resistivity). The present separator which unexpectedly exhibits this combination of properties is sheet formed from a homogeneous admixture of a polyolefin, a plasticizer for said polyolefin, and a particulate filler material selected from titania, alumina, magnesium or calcium hydroxide or mixtures thereof having a surface area in the range of from 100 to 385 $m^2/cc$ and a pore volume of 0.075 cc/gm.

DETAILED DESCRIPTION OF THE INVENTION

The alkaline battery separator of the present invention is in the form of a very thin sheet which is required to be formed from a homogeneous admixture of a polyolefin, a plasticizer for the polyolefin and a particulate filler, each described herein below. The components of the admixture are present in from 5 to 20 weight percent of the polyolefin, from 10 to 60 weight percent of the platicizer and from 30 to 75 weight percent of the filler.

The present invention requires the utilization of a polyolefin, preferably polyethylene or polypropylene of high density. The polyolefin must have an average molecular weight of at least 100,000, and can be selected from polyolefins having average molecular weights of from 100,000 to about 2,000,000. The polyolefin can be selected from homopolymers, such as polyethylene or polypropylene or from copolymers formed from a mixture of hydrocarbon olefinic monomers, such as ethylene, propylene, butene and the like, or from a mixture of at least 90 percent by weight of hydrocarbon olefinic monomer with other olefinic monomer, such as acrylic acids and esters.

The polyolefin can be comprised of a mixture of a high molecular weight polyolefin and a low molecular weight polyolefin. Representative of polyolefins of high and low molecular weight which are operable in the instant invention are polyethylene, polypropylene, polybutene, ethylene-propylene copolymers, ethylene-butene copolymers, propylene-butene copolymers, ethylene-acrylic acid copolymers and the like. The mixture can be formed from about 5 to 95 weight percent high molecular weight polymer with the corresponding about 95 to 5 weight percent of low molecular weight polymer. It is preferred that the low molecular weight polymer be the major component of the polyolefin mixture.

The term "high molecular weight polyolefin," as used herein, is intended to refer to a polyolefin having an average molecular weight of at least 500,000. The term "low molecular weight polyolefin," as used herein, refers to polyolefins having an average molecular weight of from 100,000 to 500,000.

When only one polyolefin is used in forming the subject separator, the average molecular weight should preferably be greater than 150,000 and, preferably, greater than 200,000.

The polyolefin must be substantially insoluble in the solvents used and at the temperatures used to extract the plasticizer from the polyolefin-filler-plasticizer composition. Such insolubility or inertness to the action of solvents is imparted to the polyolefin by its crystallinity content or by the judicious choice of solvent used in the extraction procedure. The partially crystalline polyolefin, such as polyethylene and isotactic polypropylene are ideally suited to such an application because they are substantially insoluble in common hydrocarbons and other organic and aqueous solvents at low temperatures.

Conventional stabilizers or antioxidants are employed in the compositions of the present invention to prevent thermal and oxidative degradation of the polyolefin component. Representative of the stabilizers are 4,4 thiobis (6-tert-butyl-m-cresol) ("Santonox"), and 2,6-di-tert-butyl-4-methylphenol ("Ionol").

The plasticizer of the instant composition improves the processability of the composition, i.e., lower the melt viscosity, or reduces the amount of power input which is required to compound and to fabricate the composition and aids in inducing porosity, as discussed herein below.

The plasticizer can be soluble or insoluble in water. Representative of the water-insoluble plasticizers are organic esters, such as the sebacates, phthalates, stearates, adipates, and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer, oxidized polyethylene, coumarone-indene resins and terpene resins; tall oil and linseed oil.

Illustrative of the water-soluble plasticizers are ethylene glycol, polyethylene glycol, polypropylene glycol, glycerol, and ethers and esters thereof; alkyl phosphates such as triethyl phosphate; polyvinyl alcohol, polyacrylic acid and polyvinyl pyrolidone.

When a plasticizer is used which is not totally removed from the composition during the extraction step but forms part of the battery separator, it imparts flexibility, high elongation and resistance to the battery separator.

There are a number of water-soluble, normally solid plasticizers which are sufficiently inert to form a part of the battery separator. Typical examples of these plasticizers are polyisobutylene, polybutadiene, polystyrene, atactic polypropylene, ethylene-propylene rubber, and ethylene vinyl acetate copolymer. Generally, when this type of plasticizer is used, it can be included in the battery separator in an amount as high as 40 percent by volume of the battery separator composition.

The fillers required for formation of the improved alkaline separator are titania, alumina, magnesium or calcium hydroxide or mixtures thereof which have the specifically required properties of surface area of from 100 to 385 $m^2/cc$ and pore volume (BET) of at least 0.075 cc/gm and, preferably, from 0.08 to 0.8 cc/gm. The most desirable separator is formed from the above-described polyolefin and plasticizer with titania, having surface area of from 180 to 325 $m^2/cc$ and more preferably from 200 to 300 $m^2/cc$, and a pore volume of at least 0.075 cc/gm, and more preferred from 0.1 to 0.4 cc/gm. The surface area of the presently required fillers is determined in surface area per unit volume. This takes into account variations in densities of the respective fillers. The density of the desired fillers are about 3.9 to 4.2 for alumina; about 3.8 to 4.3 for titania; about 2.4 for magnesium hydroxide; and about 3.3–3.4 for calcium hydroxide.

It has been presently found that when the above-described particulate filler material is used, the electrical conductivity and the dendristatic ability of the separator is greatly enhanced over that obtained by conventional separator membranes. It is believed that the presently required filler material has certain properties which allow the filler to interact with the electrolyte in a manner which causes exceptionally good conduction of the electrolyte through the separator membrane. The enhanced properties attained by the subject fillers is due to a combination of effects. It is presently believed that the porosity is sufficient to permit conduction of electrolyte therethrough while being sufficiently low to aid in inhibition of dendrite growth and formation. The required surface area of the filler is believed to aid in permitting wetting of the filler particles and, therefore, the separator with electrolyte and to be sufficient to also aid in holding at least a part of plasticizer during processing. Finally, it is believed that the chemical nature of the required fillers permits absorption of the electrolyte by the filler and thereby acts as a micro wick which acts as a ready means of passage of electrolyte through the separator membrane, and to permit more even wetting of the membrane by the electrolyte.

The filler particles can be of a size ranging from an average of about 0.01 micron to about 10 micron in diameter.

It should be understood that any of the commercially available wetting agents known to the art, such as sodium alkyl benzene sulfonate, sodium lauryl sulfate, dioctyl sodium sulfosuccinate, and isooctyl phenyl polyethoxy ethanol, can be used to enhance the wettability of the filler prior to its inclusion in the composition and to thereby cause a more uniform distribution of the filler in the admixture.

A preferred embodiment of the subject invention further requires the inclusion of carbon black in less than 10 weight percent, based on the total weight of the admixture. The carbon black should be of the type conventionally known as conductive carbon black, which exhibit low hydrogen overvoltage. They must also have a surface area of at least 100 $m^2/cc$ and more preferably from 250 to 2000 $m^2/cc$. The particle size of the carbon blacks are from about 1 to 75 millimicrons (BET). The preferred and most effective amount is from 0.25 to 5 weight percent. The carbon blacks meeting these requirements are commercially available. It has been unexpectedly found that when one includes the above-described conductive carbon black, one effectively reduces the shorting between electrodes of opposite polarity, due to dendrite growth.

According to the invention, the battery separator is produced by a process which comprises blending a composition of from 5 to 25 weight percent of polyolefin, 30 to 75 weight percent of filler material, and from 20 to 60 weight percent plasticizer, forming said composition into sheet form and, subsequently, extracting from said sheet by means of a suitable solvent at least a portion of the plasticizer. The preferred weight percent of the above components of the admixture are, respectively, 5 to 20; 35–70; and 15 to 50.

The composition of the resultant separator will depend upon the degree of extraction of the plasticizer. The plasticizer can be substantially completely removed, leaving a highly filled polymeric sheet product or, alternatively, can have 60 percent and, preferably, 75 percent of the plasticizer of the admixture removed. These products normally show good retention of physical properties, as well as good electrical stability and dendrite inhibition properties. The extracted separator membrane normally has from about 7 to 30 percent polyolefin, about 50 to 93 percent filler, and from about 0 to 15 percent plasticizer. The more preferred separators comprise a mixture of from 10 to 25 percent polyolefin, 60 to 90 percent filler, and from 2 to 8 percent plasticizer.

In a preferred embodiment, 8 weight percent polyolefin, 70 weight percent filler, and 22 weight percent plasticizer are blended together, extruded to provide a flat sheet and then sufficient plasticizer is extracted to provide a finished separator composed of 10 weight percent polyolefin, 87.5 weight percent filler, and 2.5 weight percent plasticizer.

A particularly preferred composition consists essentially of polyethylene having at least 50 percent by weight crystallinity, finely-divided titania, conductive carbon black, and petroleum oil.

The components of the instant composition can be mixed by any conventional manner which will produce a substantially uniform mixture. To produce a particularly uniform mixture, the components can be premixed at room temperature in a blender. The polyolefin-filler-plasticizer dry blends are then fluxed in a conventional mixer, such as a Banbury mixer or melt homogenized in a conventional two roll mill.

After being suitably mixed, the composition is molded or shaped in any conventional manner. Specifically, it can be fed to an extrusion, calendering, injection molding, or compression molding machine to be processed into its final form.

The term "sheet" or "membrane" as used in the subject application is intended to define a planar material which is formed from the initially composed admixture both prior and subsequent to extraction of plasticizer therefrom. The sheet material should be preferably, a film which is less than about 10 mils thick and, more preferably, less than 7 mils thick with from about 2 to 7 being most perferred. It has been found that the highly filled polymeric composition of the present invention can be readily formed into such thin sheet material by conventional techniques.

The process of forming the subject separator comprises blending the components described herein above to form a substantially uniform admixture thereof, forming the admixture into a sheet product and, subsequently, extracting from said sheet at least a portion of the plasticizer contained therein.

The procedure for extraction of the plasticizer from a sheet product is well known and is not meant to form a part of the present invention, per se. A single stage extraction can be used. The solvent or extraction conditions should be chosen so that the polyolefin and filler are essentially insoluble. For example, when petroleum oil is to be extracted from the molded composition, the following solvents are suitable; chlorinated hydrocarbons, such as trichloroethylene, tetrachloethylene, carbon tetrachloride, methylene chloride, tetrachloroethane, etc; hydrocarbon solvents such as hexane, benzene, petroleum ether, toluene, cyclohexane, gasoline, etc. If polyethylene glycol is to be extracted, the extraction medium can be water, ethanol, methanol, acetone, aqueous or alcoholic sodium hydroxide, potassium hydroxide, and the like. Generally, acids such as hydrochloric acid should not be used as these would attack the required filler component.

The extraction temperature can range anywhere from room temperature up to the melting point of the polyolefin as long as the polyolefin does not dissolve.

The time of the extraction will vary depending upon the temperature used and the nature of the plasticizer or filler being extracted. For example, when a higher temperature is used, the extraction time for an oil of low viscosity can be only a few minutes, whereas if the extraction is performed at room temperature, the time requirement for a polymeric plasticizer can be in order of several hours.

The final composition of the separator will depend upon the original composition and the degree of extraction of the plasticizer from the sheet product.

The surface area, pore sizes and the pore volumes of the filler of the instant invention were measured using the nitrogen absorption method described by S. Brunauer, P. J. Emett, and E. Teller in the Journal of American Chemical Society, Vol. 6, page 308 (1938), and commonly known as the BET method.

The average pore sizes of the resultant separator membrane were measured by water permeability method in accordance with the procedure described in "Characteristics of Separator for Alkaline Silver Oxide-Zinc Secondary Batteries-Screening Methods" by J. E. Cooper and A. Fleischer.

The electrical resistances of the resultant separators were determined by the direct current method described by J. E. Cooper and A. Fleischer, supra.

The porosity volume percents or void volume percent were calculated for the resultant separator from wet weight minus dry weight divided by the separator sample geometric wet volume.

Chemical and oxidation stability of the resultant separator was measured by subjecting duplicate samples of separator to KOH solution (45%) at 0.4 amp/cm$^2$ overcharge for 96 hours at 80° C. and compared weight loss and/or physical property changes with that of untreated sample.

Tensile tests were conducted on a Scott Tester or Instron Tensile Testor (model TM) using a sample width of 0.25 inch and a 0.4 inch jaw separation, and a cross head speed of 0.2"/min.

The following examples are given for illustrative purposes only and are not meant to be a limitation on the subject invention, except as made in the claims appended hereto. All parts and percentages are by weight unless otherwise indicated.

EXAMPLE I

A separator membrane of the present invention was formed by initially introducing into a B-Banbury internal mixer 10 parts of commercially available high density polyethylene ($\overline{MW}$ of 250,000), 5 parts of commercially available high density polyethylene (MW of about 2,000,000) and 38 parts of low aromatic, saturated hydrocarbon petroleum oil (Shellflex 411; 547 SSU at 110° F.) and 0.1 part of Santonox followed by 47 parts of titanium dioxide (P-25; 5% rutile, 95% anatase, density 4.3, BET surface area 280 $m^2$/cc, BET pore volume 0.35 cc/g, average pore diameter 212A). After complete addition of the components, they were compounded in the mixer at 400° F. for about 8 minutes. The resultant composition was removed from the mixer, cooled, and ground to a coarse powder in a Wiley mill. The powder was fed into a one inch single screw extruder, operated at 400° F., and extruded as pellets which were passed through two 40 mesh (U.S. Standard) screens to remove any large agglomerates. The pellets were subjected to a second extruder similar to the first, except that it was equipped with an eight inch sheeting die capable of forming sheet material of approximately 9–10 mil thick at the rate of 3 ft/min. The sheet was passed over 2 annealing rolls maintained at 200° F. and then 3 cooling rolls. The sheet product was immersed in 1,1,1-trichloroethane for 30 minutes, air dried, and then immersed in a second fresh bath of trichloroethane for 30 minutes. Samples of the extracted sheet separator were analyzed and showed that greater than 90 percent of the plasticizer was removed.

The material was tested by standard techniques to determine dendrite penetration, electrical resistance, and stability. Results are given in Table I below.

EXAMPLE II

A battery separator was formed in accordance with the preferred embodiment of the present invention in the same manner as described in Example I above, except that 2 parts of the titanium dioxide filler were substituted by 2 parts of a conductive carbon black capable of exhibiting low hydrogen overvoltage (Vulcan XC-72; 414 $m^2$/cc BET surface area, 1.8 density, BET particle size of m$\mu$).

The extracted separator membrane had greater than 90 percent of plasticizer removed. The separator was tested for dendrite penetration, electrical resistance, and stability. Results are given in Table I below. To readily compare samples, a figure of merit is calculated by dividing the dendrite resistance by the electrical resistance. Since a high dendrite resistance and a low electrical resistance are desired features, it is readily seen that the higher the figure of merit value, the more desirable the separator overall properties.

TABLE I

| Sample | Thickness (Mils) | ER ohm-cm | Dendrite Resistance Min | Min/Mil | Figure of Merit |
|---|---|---|---|---|---|
| I | 9.9 | 9.8 | 164 | 16.6 | 1.7 |
| II | 10 | 13.3 | 490 | 49.0 | 3.7 |

EXAMPLE III

Battery separators were formed using titanium dioxide fillers having different surface areas and pore volumes. In this manner, filler materials meeting the physical property criterias of the present invention are compared with fillers outside of the present invention. The titanium dioxide fillers had the following properties:

| Sample | $TiO_2$ Fillers Rutile % | Anatase % | Density g/cc | BET Surface Area ($m^2$/g) | $N_2$ Pore Volume (cc/g) | Average Pore Diameter |
|---|---|---|---|---|---|---|
| A | | 99 | 3.9 | 9.17 | 0.0042 | 166 |
| B | 5 | 95 | 4.3 | 65 | 0.3450 | 212 |
| C | 97 | | 4.2 | 10.11 | 0.0225 | 89 |
| D | 82 | | 3.8 | 54 | 0.1100 | 82 |

Separator samples were formed by introducing into a Brabender internal mixer 13 parts of a commercially available high density polyethylene ($\overline{MW}$=250,000), 45 parts of petroleum oil (Shellflex 411) and 0.1 part of Santonox. The components were mixed for less than 5 minutes and than 40 parts of $TiO_2$ particulate material (range from 0.01 to 7 microns), and 2 parts conductive carbon black (Vulcan XC-72) were added. The materials were mixed at 50 rpm for 10 minutes at a head temperature of 160° C. The material was removed from the mixer and then reinserted to insure thorough mixing. The second mixing period was done at 50 rpm, 160° C. for 10 minutes. The material was cooled and ground to a coarse powder. Two parts of each of the resultant materials were placed between sheets of Mylar and pressed at 1,200 psi for 5 minutes at 140° C. The Mylar sandwiched samples were placed between one-half inch thick aluminum slabs to cause rapid cooling of the samples.

Each sample was subjected to extraction by immersing the sample in a bath of hexane for one-half hour at room temperature and then in a fresh bath for an additional half hour. Analysis of each sample established that greater than 97 percent of the plasticizer (Shellflex) content was removed. The percent pore volume of the samples were each about 65%.

The samples were tested for electrical resistance, dendrite penetration resistance and stability to alkali and oxidation. The results are given in Table II below:

TABLE II

| Sample | $TiO_2$ | Thickness in mils | ER ohm cm | Dendrite Resistance in min. | Stability Percent Elongation Before | After | % Change |
|---|---|---|---|---|---|---|---|
| A | A | 4.7 | 24.6 | 68 | 640 | 239 | 62.7 |
| B | B | 8.3 | 11.8 | 67 | 307 | — | — |
| C | C | 6.2 | 21.7 | 29 | 400 | 147 | 63.3 |
| D | D | 5.0 | 13.2 | 42 | 868 | 590 | 31.6 |

The above data comparatively shows that separator membranes formed from titania having the physical properties required by the present invention (Samples B and D) have superior electrical resistance, in general, than Samples A and C.

EXAMPLE IV

Battery separator membranes were formed in the manner described in Example III above using the components described therein with titanium dioxde samples A, C, and D, Sample D representing the filler required by the present invention. The amount of each component was 8 parts polyolefin, 68 parts $TiO_2$, 22 parts plasticizer, 2 parts conductive carbon black, and 0.1 part stabilizer. The membranes, after extraction with hexane had a composition of 10 parts polyolefin, 87 parts $TiO_2$, 0.7 parts plasticizer, 0.1 part stabilizer, and 2.2 parts carbon black. The percent pore volume of each sample was about 48 percent. The separator samples were tested for electrical conductivity, dendrite resistance, and physical properties before and after subjection to alkali and oxidation stability.

TABLE III

| $TiO_2$ | Thickness in mils | ER ohm-cm | Dendrite Resistance in min. | % Elongation Before | % Elongation After | % Change |
|---|---|---|---|---|---|---|
| A | 7.4 | 13.1 | 41 | 547 | 14 | 97.5 |
| C | 6.1 | 12.6 | 85 | 694 | 141 | 79.7 |
| D | 7.1 | 6.6 | 67 | 172 | 143 | 16.7 |

The overall performance of the separator containing titania "D" was superior than that of the other samples.

EXAMPLE V

Separator membranes were formed in the same manner as described in Example IV above, except that different commercially available conductive carbon blacks were used for the Vulcan XC-72. The various conductive carbon blacks were:

Vulcan XC-72 with surface area of 414 $m^2/cc$, density of 1.8 gm/cc and particle size of 15 mμ.

Elftex 132 (Cabot) with surface area of 133 $m^2/cc$, density of 1.8 gm/cc and particle size of 45 mμ.

Vulcan C (Cabot) with surface area of 225 $m^2/cc$, density of 1.8 gm/cc and particle size of 27 mμ.

Black EC (Ketjen) with surface area of 1800 $m^2/cc$, density of 1.8 gm/cc and particle size of 3.5 mμ.

Each sample showed an excellent combination of properties, as indicated in Table IV below:

TABLE IV

| Sample by Carbon Black By Name | Thickness in mils | ER ohm-cm | Dendrite Resistance in min | Stress Psi B | Stress Psi A* | % Elongation B | % Elongation A |
|---|---|---|---|---|---|---|---|
| XC-72 | 7.1 | 6.6 | 67 | 485 | 505 | 172 | 143 |
| Elftex | 6.1 | 7.1 | 57 | 562 | 424 | 33 | 123 |
| Vulcan C | 7.6 | 8.9 | 72 | 462 | 441 | 185 | 418 |
| Black EC | 8.4 | 8.6 | 133 | 552 | 429 | 89 | 192 |

*Before (B) and after (A), subjection to KOH (45%) at 80° C. for 96 hours or rapid oxidation test at 0.4 amp/$cm^2$ overcharge for 96 hours at 80° C.

EXAMPLE VI

A separator was formed in accordance with the present invention in accordance with the procedure of Example I above, except that the feed components were 15 parts high density polyethylene (MW=250,000), 45 parts $TiO_2$ (P-25), 38 parts petroleum oil (Shellflex 411), and 2 parts conductive carbon black (XC-72). The resultant separator had a composition of 22 parts polyolefin, 65 parts filler, 3 parts carbon black, and 10 parts plasticizer. The membrane was 9 mils thick and had electrical resistance of 20 ohm-cm, dendrite resistance of 45 min/mil or 405 min, and calculated porosity of 48.5 volume percent.

EXAMPLE VII

A separator was formed in the same manner as described in Example III above, except that alumina having a density of 3.97, a surface area of 373 $m^2/cc$, and a $N_2$ pore volume of 0.8 cc/gm was used. The components were 30 parts of the alumina, 26 parts high density polyethylene (MW=250,000), and 44 parts petroleum oil. The resultant membrane had a thickness of 10 mils, electrical resistance of 20 ohm-cm, and a dendrite penetration of 43 min. The material showed excellent stability to alkali (KOH) and oxidation.

In comparison, a separator which is formed from low surface area alumina exhibits a poor combination of properties.

EXAMPLE VIII

A separator was formed in the same manner as described in Example III above, except that calcium hydroxide having a density of 3.4 gm/cc, a surface area 110 $m^2/cc$, and a $N_2$ pore volume of 0.11 cc/gm instead of the titania. The components of the admixture forming the separator were in the amounts of 12 parts polyolefin, 7 parts conductive carbon black, 17 parts petroleum oil, and 63 parts calcium hydroxide. The resultant separator had a thickness of 7.8 mils, an electrical resistance of 44 ohm-cm, and a dendrite resistance of 300 min.

A similar sample is formed with a filler of lower surface area and exhibits poorer properties.

While the invention has been described in connection with certain preferred embodiments, it is not intended to limit the invention to the particular form set forth, but on the contrary, it is intended to cover such alternatives, modifications, and equivalents as defined by the appended claims.

What is claimed is:

1. In an alkaline battery system having positive electrodes, negative electrodes, an alkaline electrolyte and separator membrane positioned between positive and negative electrode pairs, wherein the improvement comprising separator membranes, each having a thickness of less than about 10 mils and formed from an admixture of from 7 to 30 weight percent polyolefin having an average molecular weight of at least 100,000; from 0 to 15 weight percent plasticizer; and from 50 to 93 weight percent of a filler selected from titania, alumina, magnesium hydroxide or calcium hydroxide, said filler having a surface area of from 100 to 385 $m^2/cc$ and a pore volume of at least 0.075 cc/gm.

2. The system of claim 1 wherein the separator composition further contains up to 10 weight percent of a conductive carbon black having a surface area of at least 100 $m^2/cc$.

3. The system of claim 1 or 2 wherein the filler is titania having a surface area of from 125 to 385 $m^2/cc$ and a pore volume of from 0.08 to 0.8 cc/gm.

4. The system of claim 1 or 2 wherein the filler is alumina having a surface area of from 125 to 385 $m^2/cc$ and a pore volume of from 0.08 to 0.8 cc/gm.

5. The system of claim 1 or 2 wherein the filler is magnesium hydroxide having a surface area of from 125 to 385 $m^2/cc$ and a pore volume of from 0.08 to 0.8 cc/gm.

6. The system of claim 1 or 2 wherein the filler is calcium hydroxide having a surface area of from 125 to 385 $m^2$/cc and a pore volume of from 0.08 to 0.8 cc/gm.

7. The system of claim 1 or 2 wherein the filler is titania having a surface area of from 180 to 325 $m^2$/cc and a pore volume of from 0.1 to 0.4 cc/gm.

8. The system of claim 1 or 2 wherein the filler is titania having a surface area from 200 to 300 $m^2$/cc and a pore volume of from 0.1 to 0.4 cc/gm.

9. The system of claim 1 or 2 wherein the polyolefin comprises a major amount of a polyolefin having an average molecular weight of from 100,000 to 500,000 and a minor amount of a polyolefin having an average molecular weight of from 500,000 to 2,000,000.

10. The system of claim 1 or 2 wherein the polyolefin is a mixture of from 5 to 95 percent of a polyolefin having an average molecular weight of from 100,000 to 500,000 and the remaining amount being a polyolefin having an average molecular weight of from 500,000 to 2,000,000.

11. The system of claim 1 or 2 wherein the system is a Ni-Zn secondary alkaline battery system.

12. The system of claim 1 or 2 wherein the system is a Ni-Fe secondary alkaline battery system.

13. The system of claim 1 or 2 wherein the polyolefin is a copolymer selected from the group consisting of copolymers of a mixture of hydrocarbon olefinic monomers or copolymers of a mixture of at least 90 weight percent hydrocarbon olefinic monomer and up to 10 percent acrylic acid or ester.

* * * * *